US011066241B2

(12) United States Patent
Issing et al.

(10) Patent No.: US 11,066,241 B2
(45) Date of Patent: Jul. 20, 2021

(54) TWO-STAGE PICKING BY MEANS OF SORTER HAVING HIGH-DYNAMIC SORTER TRAYS

(71) Applicant: SSI Schäfer Automation GmbH (DE), Giebelstadt (DE)

(72) Inventors: Elmar Issing, Giebelstadt (DE); Christian Herzmaier, Würzburg (DE)

(73) Assignee: SSI Schäfer Automation GmbH, Giebelstadt (DE)

( * ) Notice: Subject to any disclaimer, the term of this patent is extended or adjusted under 35 U.S.C. 154(b) by 0 days.

(21) Appl. No.: 17/043,298

(22) PCT Filed: Jun. 12, 2019

(86) PCT No.: PCT/EP2019/065296
§ 371 (c)(1),
(2) Date: Sep. 29, 2020

(87) PCT Pub. No.: WO2019/238728
PCT Pub. Date: Dec. 19, 2019

(65) Prior Publication Data
US 2021/0047122 A1 Feb. 18, 2021

(30) Foreign Application Priority Data
Jun. 12, 2018 (DE) .................... 10 2018 114 026.6

(51) Int. Cl.
*B65G 1/137* (2006.01)
*B07C 3/08* (2006.01)
(Continued)

(52) U.S. Cl.
CPC .............. *B65G 1/1378* (2013.01); *B07C 3/08* (2013.01); *B65G 17/12* (2013.01); *B65G 37/02* (2013.01);
(Continued)

(58) Field of Classification Search
CPC .. B65G 1/0485; B65G 1/1376; B65G 1/1378; B65G 11/023; B65G 17/12; B65G 17/20;
(Continued)

(56) References Cited

U.S. PATENT DOCUMENTS 6,721,627 B2 * 4/2004 Udou .................. B65G 1/0485
104/88.01
8,480,347 B2 * 7/2013 Schafer ................ B65G 1/1378
414/281
(Continued)

FOREIGN PATENT DOCUMENTS

AT 511868 A1 3/2013
DE 10 2007 005 561 A1 8/2008
(Continued)

OTHER PUBLICATIONS

International Search Report and Written Opinion and translation for corresponding International Patent Application No. PCT/EP2019/065296 dated Sep. 26, 2019.
(Continued)

*Primary Examiner* — Gene O Crawford
*Assistant Examiner* — Keith R Campbell
(74) *Attorney, Agent, or Firm* — Renner, Otto, Boisselle & Sklar, LLP

(57) ABSTRACT

It is disclosed storage and order-picking system, comprising: a control device configured for performing two-stage picking of articles, wherein the two-stage picking comprises a first article-orientated picking stage, and a second order-orientated picking stage; a warehouse, wherein the articles in the warehouse are stored in storage containers in an article-pure manner, and wherein the articles are retrieved in an article-orientated manner from the warehouse in the first picking stage; a sorter comprising: a loop-shaped main line operated continuously; at least one branch line, wherein
(Continued)

each of the branch lines is coupled, preferably mesh-shaped, to the main line and is operable discontinuously; and a plurality of sorter trays, wherein each of the trays is configured to be moved along the lines and to be fed into and out from the main line; one or more separation stations, wherein each of the separation stations: is coupled to the main line via one of the branch lines; is coupled to the warehouse for being supplied with storage containers; and is configured for reloading the articles from the storage containers onto the trays for transferring the articles in the first picking stage in accordance with order lines and/or individually onto respectively one of the trays located on the one of the branch lines; and a plurality of automatically and/or manually operated target locations for the second picking stage, wherein each of the target locations is coupled: to one of the branch lines; and/or directly to the main line.

19 Claims, 8 Drawing Sheets

(51) Int. Cl.

| | | |
|---|---|---|
| *B65G 17/12* | (2006.01) | |
| *B65G 47/38* | (2006.01) | |
| *B65G 47/64* | (2006.01) | |
| *B65G 47/90* | (2006.01) | |
| *B65G 37/02* | (2006.01) | |
| *B65G 11/02* | (2006.01) | |
| *B65G 17/20* | (2006.01) | |

(52) U.S. Cl.
CPC ........... *B65G 47/38* (2013.01); *B65G 47/642* (2013.01); *B65G 47/643* (2013.01); *B65G 47/90* (2013.01); *B65G 11/023* (2013.01); *B65G 17/20* (2013.01); *B65G 2201/0258* (2013.01)

(58) Field of Classification Search
CPC ...... B65G 37/02; B65G 47/38; B65G 47/642; B65G 47/643; B65G 47/90; B65G 47/962; B65G 2201/0258; B07C 3/08
See application file for complete search history.

(56) References Cited

U.S. PATENT DOCUMENTS

| | | | | |
|---|---|---|---|---|
| 9,199,792 B2* | 12/2015 | Schafer | ................ | B65G 1/1378 |
| 9,592,960 B2* | 3/2017 | Schafer | ................ | B65G 1/1376 |
| 2016/0052716 A1* | 2/2016 | Schnabl | ................ | B65G 1/065 |
| | | | | 414/273 |
| 2018/0050870 A1* | 2/2018 | Mathi | ................ | B65G 1/0492 |
| 2018/0290829 A1* | 10/2018 | Schroepf | ................ | G06Q 50/28 |

FOREIGN PATENT DOCUMENTS

| | | | |
|---|---|---|---|
| DE | 10 2007 011 856 A1 | | 9/2008 |
| DE | 10 2011 018 983 A1 | | 10/2012 |
| DE | 10 2016 002 760 A1 | | 9/2017 |
| EP | 2876060 A1 | | 5/2015 |
| JP | 2014-141313 A | | 8/2014 |
| JP | 2014141313 A | * | 8/2014 |
| JP | 2015-042587 A | | 3/2015 |
| JP | 2017-071458 A | | 4/2017 |
| JP | 2017071458 A | * | 4/2017 |
| WO | 2008/061744 A1 | | 5/2008 |
| WO | 2011/107385 A1 | | 9/2011 |
| WO | 2016/139003 A1 | | 9/2016 |

OTHER PUBLICATIONS

German Office Action with translation for corresponding German Patent Application No. 10 2018 114 026.6 dated May 17, 2019.

* cited by examiner

TWO-STAGE PICKING BY MEANS OF SORTER HAVING HIGH-DYNAMIC SORTER TRAYS

The present invention relates to a storage and order-picking system configured for batch picking and comprising a high-dynamic sorter. The invention is particularly used for handling a picking process in the area of e-commerce.

E-commerce makes the picking (removal of an article from a storage receptacle and delivery of the removed article to a target receptacle in accordance with a picking order) more and more difficult because the assortments of articles (number of different types of articles being stored) are getting bigger and bigger while delivery times accepted by the customers become shorter and shorter (<24 h).

Assortments of articles which are typical for e-commerce can include quickly several hundred thousands of different types of article. Assortments of articles from three hundred thousand to a billion of different types of article exist absolutely in e-commerce.

The customers expect delivery of their orders within 24 hours. This means that a lot of different types of articles need to be stored within the order-picking centers and distribution centers, which in turn enlarges the storage areas and transporting paths. The articles need to be picked very fast. Since the storage areas are dimensioned correspondingly gigantic, the transporting paths can become very long until the articles from the warehouse arrive at the picking station, in particular if picking is carried out in one stage (cf. FIG. 12).

Due to e-commerce the common order structure has changed (cf. FIG. 13). While in previous times intralogistics systems were substantially used for supplying subsidiaries (B2B), where, for example, one entire truck has been loaded with one order, nowadays the systems need to be ready for the B2C online business (within 24 hours). Today the average number of order lines per order approaches more and more the factor 1. Already today the order of magnitude in e-commerce is less than two order lines per order.

Today "batches" are formed and picking is carried out in two stages in order to not retrieve each storage receptacle individually from the warehouse for each order (and store the same later again).

In general, in case of two-stage picking processes several customer orders are collected and merged (in advance) in order to be processed simultaneously, which is also called parallel picking. With the two-stage picking process the processes of the provision of articles and removal of articles (first step) as well as the order-specific collection of the removed articles (second step) is conducted in two separates steps. By this measure all (types of) articles, which occur in a bigger amount of (different) orders, can be retrieved in a first step.

Thus, the corresponding order receptacle needs to be retrieved only once, but then can be moved to several removal locations so that path times are reduced significantly.

With the classical two-stage picking process all articles are removed at the same location in the first step. In the second step the distribution of the removed articles to the customer orders is conducted (by means of transport). For conducting this second stage different conveying systems, so-called sorting and distribution systems or sorters, are available.

The batch picking requires a relative high system capacity for order preparation, for transporting the storage receptacles, and for distributing the removed articles to the customer orders.

Sorters, and in particular high-efficiency sorters, are generally closed and fast circulating conveying lines coupled to one or more infeed stations for giving the articles onto the sorter, and are coupled to one or more delivery stations, or target locations, to which the articles are to be delivered by the sorter in an order-orientated manner.

Circulating tilting-tray sorters, circulating transversal-belt sorters, and linear sorters such as slat sorters or linear transversal-belt sorters are widespread. These sorters can sort articles per hour, and distribute them on the target locations.

The sorting performance is dependent on the circulating velocity and the pitch of the trays. For example, twelve thousand sorting processes per hour can be achieved at a velocity of 2 meter per second. However the (receiving) capacity of the known sorters is limited. Only as many articles can be given on the sorter as "locations" (e.g., sorter trays) exist. Of course, it is possible to increase the number of locations by enlarging the overall length of the circle. However, floor-space requirement of the sorter within the logistic overall solution is enlarged by this measure. Typically, big areas are not available, and the investment costs increase.

The higher the circulating velocity is, the more difficult it is to feed in and feed out the articles. At high velocities the articles can get separated from the trays (e.g., drop off). In particular, during a feeding-out process the high circulating velocities have a negative effect because the geometrical size of the target locations needs to become bigger and bigger if the circulating velocity increases, in order to reliably hit the target location during the feeding out. An enlargement of the target locations, however, results in a decrease of the number of target locations arrangeable along the sorter. A decrease of the number of possible target locations in turn has a negative effect on the so-called "batch factor" (number of concatenated orders) because in this case less and less orders can be processed simultaneously. The simultaneous processing of, for example, thousand orders is not possible if only 5-10 target locations are available.

Additionally, high velocities can result in article damages. The articles can be delivered to the wrong target location so that an unintended mix of articles is established.

Also with another approach, where it is picked in two-stages without the use of sorters, the storage receptacle (which is filled by one type of article only) is retrieved only one single time. However, this storage receptacle is then transported, in accordance with a multiple-stop strategy, to a plurality of picking stations (cf. "KP" in FIG. 12), wherein each of the picking stations typically can operate 6-7 orders in parallel (i.e. collect articles in an order-orientated manner). This approach results in a relatively complex transporting network which is to be arranged between the warehouse and the picking stations. This transporting network is typically formed by steady conveyors, as exemplarily shown in FIG. 12.

In this context it is to be noted that besides the transporting system for the storage receptacle also a transporting system for the order receptacles, into which removed articles are delivered, needs to be provided. Also in this case several approaches exist. The order receptacles can be transported via the same conveying system as the storage receptacles. However, the order receptacles are typically moved via a dedicated transporting system. By this measure the complexity of the overall transporting system is in turn increased.

The "synchronization" of the storage receptacles and the order receptacles is difficult in this case. The storage receptacles and the order receptacles commonly need to be at the same location at the same time.

Further, in this case it is possible to cause stopping of the order container at several picking stations for removing the articles belonging to the corresponding order. In this context one speaks of a multiple-stop strategy for the order containers. A corresponding multiple-stop strategy can also be applied, of course, to the storage receptacles. The result thereof is that the control of the traffic of storage receptacles and order receptacles, and in particular the synchronization thereof, is complex and difficult.

The present invention moves in this field of tension.

The document WO 2008/061744 A1 discloses a tray sorter which is filled manually. The filling is performed with a filling station comprising a plurality of filling shafts arranged above the circulating trays. The filling shafts are opened in a computer-controlled manner at the right time so that articles stored therein fall into a predetermined tray of the sorter which is circulating very fast. The filled trays are automatically emptied into the target locations coupled to the sorter. The articles are removed from storage containers, which are transported to the filling station in an article-orientated or batch-orientated manner, for filling the shafts.

The document WO 2011/107385 A1 discloses a universal high-performance picking station which may be utilized in FIG. 12. This universal picking-work station is configured to process a plurality of storage receptacles and a plurality of order receptacles in parallel which are provided in a limited picking zone.

The document DE 10 2007 005 561 A1 discloses a picking system including a rack-transporting unit, and a method for operating the system.

The document DE 10 2007 011 856 A1 discloses a picking rack accessible from both sides, and a picking method.

The document DE 10 2016 002 760 A1 discloses a high-bay warehouse, which is formed as a flow rack, including picking stations connected thereto.

Therefore, it is an object to provide a storage and order-picking system meeting the requirements of e-commerce, having a small floor-space requirement, and allowing a high picking performance.

This object is solved by a storage and order-picking system comprising: a control device configured for performing two-stage picking of articles, wherein the two-stage picking comprises a first article-orientated picking stage, and a second order-orientated picking stage; a warehouse, wherein the articles in the warehouse are stored in storage containers in an article-pure manner, and wherein the articles are retrieved from the warehouse in the first picking stage in an article-orientated manner; a sorter comprising: a loop-shaped main line operated continuously; at least one branch line, wherein each of the branch lines is coupled, preferably mesh-shaped, to the main line and is operable discontinuously; and a plurality of sorter trays, wherein each of the trays is configured to be moved along the lines and to be fed into and out from the main line; one or more separation stations, wherein each of the separation stations: is coupled to the main line via one of the branch lines; is coupled to the warehouse for being supplied with storage containers; and is configured for reloading the articles from the storage containers onto the trays for transferring the articles in the first picking stage in accordance with order lines and/or individually onto respectively one of the trays located on the one branch line; and a plurality of automatically and/or manually operated target locations for the second picking stage, wherein each of the target locations is coupled to: one of the branch lines; and/or the main line directly.

The above-described system is adapted to the requirements of e-commerce. The system is capable of processing many customer orders in parallel even if each of the customer orders contains a very little number of order lines and/or pieces per order.

The sorter can handle more trays at the same time than preset by the receiving capacity of the main line.

Although the main line is operated continuously, i.e. although the trays are moved on the main line without stops and preferably at a maximum velocity possible, at least the loading process can be conducted in a state where the tray is either stopped or moves very slowly. This is possible because the tray is loaded in a mesh-shaped branch line, wherein preferably one piece is loaded per tray.

The trays can be fed into the main line and out from the main line. This is possible because the trays are not fixedly connected to the conveying means of the main line permanently, which conveying means are preferably circulating permanently in an endless manner.

The system can be completely automated. Both the loading of the trays and the unloading the trays be conducted in a fully automated manner. Preferably, robots are used for the loading and unloading.

Alternatively, the trays can be provided with an automated unloading mechanism (e.g., with a link) for the unloading, which unloading mechanism is triggered by the movement of the tray itself.

A further advantage of the system is to be seen in that little space (floor-space requirement) is needed. The sorter can be installed in an area corresponding to the classical (conveyor) front zone.

The course of the sorter is structured simple. The trays can be transported in a flowing manner and without any stop on the shortest path from the separation stations to the target locations. Path optimizations are possible.

The sorter trays can have different dimensions but can be transported nevertheless simultaneously via the main line. Mixture of different trays is possible. This allows selection of trays dependent on the dimensions of the articles. Less space is given away on the trays. The article density on the main line can be increased. Tray density on the lines can be increased.

The trays are preferably sized such that four or more trays per meter can be transported on the sorter, in particular on the main line.

Preferably, the system further comprises a conveying system for the order containers supplying the target locations with the order containers.

Articles which have been collected in an order-orientated manner in the target locations, are emptied into order containers. In this context, the order containers are preferably moved in accordance with a one-stop strategy.

In particular, each of the target locations comprises a chute and/or a collecting container.

The chute allows unloading of the trays by tilting. The articles, which have been tilted off the tray, then can be transported via the chute by means of gravity into a catching receptacle representing the collecting container. The unloading thus happens in an automated manner. The collecting container has the task to collect all articles belonging to one order. As soon as all articles of the order are present, the collecting container can be emptied into the order container. The emptying can also be conducted in an automated manner, for example, by pivoting away the base.

Further, it is preferred that the trays and/or target locations are configured to unload the articles, which are loaded onto the respective trays, in an order-orientated manner at the location of the corresponding target location in an automated manner, in particular by tilting.

In this manner the system can be further automated. The unloading of the trays is conducted automatically. The unloading of the trays is conducted in particular passively, for example, by operating a tilting mechanism of the trays by means of a link being operated while the tray passes the target location. Alternatively, the trays can already be inclined in advance, and can be provided with a movable sidewall for releasing articles from the tray.

Further, it is an advantage when the sorter further comprises transversal connecting lines within the closed main line so that the trays can overtake each other and the transporting paths become shorter from the separation stations to the target locations.

The transversal connecting lines allow path optimization.

The transversal connecting lines divide the closed main conveying line into a plurality of smaller closed main conveying lines arranged in parallel to each other. By this measure the transporting network can respond more flexible to higher traffic requirements. The possibilities increase for reaching one specific target location from the separation station.

Preferably, the control device is configured to cause, in the first picking stage, retrieval of the storage containers from the warehouse in an article-orientated manner, in particular in an article-type orientated manner, in accordance with batch picking.

The control device in advance collects a certain amount of customer orders for reducing the number of warehouse movements, i.e. the storing/retrieval of storage containers, as far as possible. Ideally, for the specific amount of customer orders one single storage container, which includes the desired article type, is retrieved and stored one single time. At the separation station the required number of articles of this article type is removed successively in total, i.e. in an order-line orientated manner or individually, and respectively given on one tray. Hence, the storage container moves in accordance with a so-called "one-stop strategy" through the system, wherein also the order containers preferably move in accordance with a one-stop strategy through the system. The fact that both the storage containers and order containers can respectively move through the system in accordance with a one-stop strategy depends in particular on the advantageous embodiment of the sorter which is operated in a circulating manner on the one hand, but which is capable to handle more trays simultaneously than determined by the maximum receiving capacity of the main line.

In particular, the system further comprises at least one of the following components: a buffer for empty trays; a picking buffer for pre-loaded trays; a link to manual or automatic picking areas; removal/delivery regions; and/or a link to a loading/unloading station for overhead-conveyor pockets.

The system is universally compatible. The system can be integrated into existing storage and order-picking systems operated in accordance with all common picking strategies. The compatibility does not have any limits.

The system enables the operator of the storage and order-picking system to respond to the severe requirements of e-commerce.

With an advantageous embodiment the sorter is implemented by a conveying system, and in particular by a chain-link conveyor.

Conveying systems, in particular steady conveyors such as chain-link conveyors, have a long lifetime, are wear-resistant, and require little maintenance.

The (loose) trays can be accumulated while the drive unit is continuously operated permanently. Accumulation pressure on the trays is minimal.

A further advantage of a chain-link conveyor is to be seen in that the chain is driven permanently, i.e. without interruption. Only a few drive (motors), in particular one single one, is required along the main line for the movement of the chain. The controlling is simple. The lines can be geometrically very long.

With a further particular embodiment the warehouse comprises at least one storage module formed by two racks having a rack aisle therebetween, wherein at least one separate separation station is associated with each of the rack modules.

The rack modules represent units independent from each other, which are serves respectively by one dedicated separation station. By this manner of arrangement very high picking performances can be achieved. Picking performance is to be understood as the number of reloading processes per unit of time. During the reloading processes the articles are distributed from the storage containers to a plurality of trays. As a rule, the reloading process is conducted in a 1:1 relationship. This means that one piece is reloaded per tray. Of course, also several pieces can transferred per reloading process. However, this typically represents the exception.

With a further advantageous embodiment the storage containers are fed via at least two separate conveying systems to the respectively associated separation station, in particular unidirectionally. The separation station comprises one robot for transferring the articles, wherein the robot preferably is arranged between the separate conveying systems such that during one movement cycle the robot can remove from each of the separate conveying systems respectively one (or more) articles and deliver an article, which has already been picked, to one of the trays between the corresponding article removals.

It is possible to buffer one or more storage containers, which have already been processed, at buffering locations for removing later articles once again.

In this case, the robot preferably moves on a semi-circular movement track, turning points of which represent the removal locations at both of the separate conveying systems. The delivery of the removed articles to the trays occurs between the turning points. The movement of the arm of the robot does not need to be stopped necessarily upon the delivery. The robot can deliver (e.g., drop) the article while the arm of the robot moves from the one of the removal positions to the opposite other removal position. Preferably, the movement of the arm of the robot is, however, decelerated.

Very high picking performances can be achieved by this approach.

In contrast to the classical supply of the robot, where the robot can also have multiple removal positions with a one-string supply, wherein these removal positions, however, repeatedly offer the same storage container since the robot is classically supplied via one conveying string only, the two separate conveying systems provide two conveyor strings. This means that always different storage containers are presented to the robot. With still other words, this means that several different storage containers can be presented to the robot per unit of time.

Additionally, so-called vision systems have more time for detecting and determining a relative position of the articles within the storage containers. Thus, there is also more time available for calculating the movement track and/or a picking process of the robot.

Preferably, two further separate conveying systems are provided separately which are configured for transporting back the storage containers into the warehouse after the removal of the articles by the robot.

In this case, in the region of the robot four separate conveying systems are provided in total. Two of these conveying systems are used for presenting the storage containers. The other two conveying systems are used for transporting back the offered storage containers, wherein, however, traffic jams do not occur because the four conveying systems are operated preferably unidirectionally and independently from each other (in particular in a loop-shaped manner).

This arrangement is particularly advantageous when the two further separate conveying systems are provided in a plane different than the feeding-conveying systems. The returning conveying systems can be arranged, for example, beneath the two feeding conveying systems. In this case, the feeding conveying systems are connected via respectively one lifting device to the discharging conveying systems associated therewith.

Correction (e.g. of a mispick) can be conducted immediately. A container, which has been returned, can be offered once again from the "back" (via the warehouse).

In this case, the robot is supplied by a conveying-system loop arranged in a plane orientated vertically. As a result the storage containers are not transported back in a (horizontal) handling plane of the robot. All storage containers located within this handling plane are potential candidates for a removal of articles.

Preferably, the sorter being arranged at a front end in front of the warehouse is not wider than the warehouse. In particular, the sorter has a depth of preferably 5 to 10 meter at maximum (in the length direction X). The same is true for a combination of the separation station and the supplying conveying system. This means, with other words, that the floor-space requirement is reduced significantly. Only 10-20% of the classical (steady conveyor) front zone are required for the same performance.

Preferably, the storage containers cannot be exchanged between the rack modules, i.e., there is no mixture or distribution via the modules.

The area required by the sorter for picking a predetermined number of customer orders per unit of time is significantly smaller than the classical one-stage container-picking process (cf. FIG. 12). The classical one-stage container-picking process requires conveying lines which are much longer (and thus require more area) for "synchronizing" the storage containers and order containers at the time of picking, i.e. for merging them at the same time at the same location. According to the classical approach for this purpose both the storage containers and order containers need to conduct a multiple-stop strategy.

It is clear that the above-mentioned and hereinafter still to be explained features cannot only be used in the respectively given combination but also in different combinations or alone without departing from the scope of the present invention.

Embodiments the invention are illustrated in the drawings and will be explained in more detail in the following description.

FIG. 1 shows a block diagram of a storage and order-picking system;

FIG. 2 schematically illustrates an exemplary course of a main line of a sorter as well as a possibility for coupling separation stations to the main line;

The present invention is used in the field of intralogistics, and in particular for the execution of e-commerce. Designations typical in the field of intralogistics for the longitudinal direction X, the transversal direction Z, and the height direction Y are also used here. In the following figures these directions X, Y, and Z are used for designating a (e.g. Cartesian) coordinate system.

In the following description it is clearly distinguished between the term "connection" on the one hand and the term "coupling", or "link", on the other hand. If two points are connected to each other, the points are in direct contact to each other via the connection. If the points are coupled to each other, they can be connected to each other directly or via intermediate points, e.g. indirectly. If one point is linked to another point this primarily expresses a coupling. However, (secondarily) this also can be a direct connection. This depends on the specific case.

Figure 1:
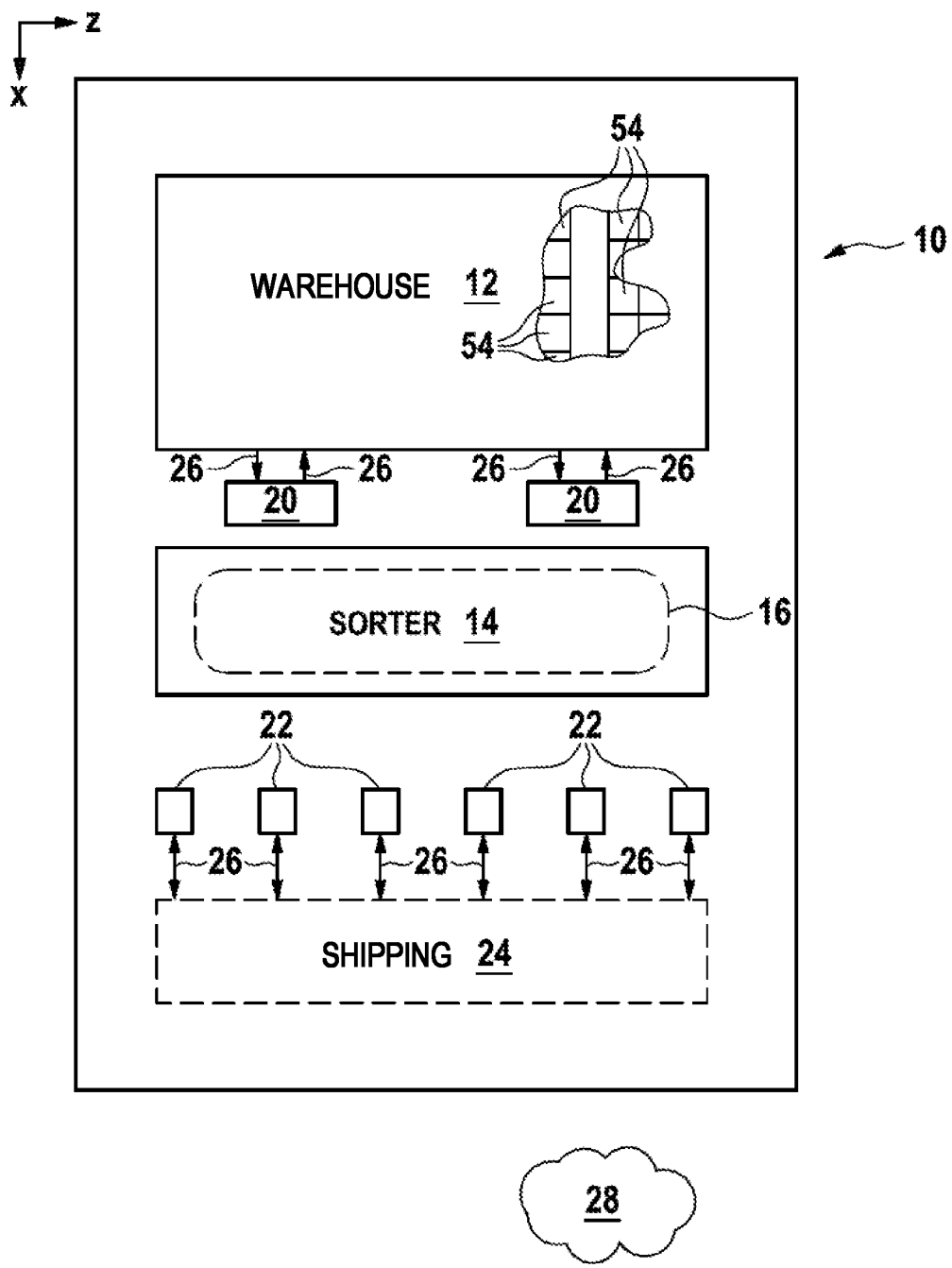

FIG. 1 shows a block diagram of a storage and order-picking system 10 which is hereinafter also briefly called a system 10. The system 10 can be, for example, a distribution center of an online retailer. The system 10 is a material-handling system or an article-handling system.

If "articles" are mentioned in the following this generally means all types of goods which can be ordered online. One article can be one single piece good, but also a packaging unit of several piece goods being connected to each other to form one unit. One article can be a case (for example, a carton) containing a plurality of piece goods, in particular of the same type of article. One article can also be an SKU (Stock Keeping Unit). In summary this means that one article is not to be understood in a limiting manner.

The articles which are used here distinguish, however, in their respective types of articles. For example, a beverage can is a first type of article, wherein a six-pack of the same beverage can is a different second type of article.

The system 10 comprises a warehouse 12 and a sorter 14. The sorter 14 is a conveying device which is loaded in an article-orientated manner and unloaded in an order-orientated manner. The sorter 14 comprises at least one endless circulating transporting element, as will still be explained in more detail below. In particular, this transporting element is driven continuously and permanently.

The sorter 14 comprises a closed loop-shaped main line 16, indicated in FIG. 1 by a dashed line, and one or more branch lines 18 (cf. FIGS. 2 and 4) following the main line 16. The main line 16 is a main transporting path connecting the separation stations 20 to the target locations 22. In order to get from the separation stations 20 to the target locations 22 it is necessary to move via the main line 16.

Further, the system 10 comprises one or more separation stations 20 as well as a plurality of target locations 22. Optionally, the system 10 can also comprise a shipping 24.

The separation stations 20 are connected, in terms of material or article flow, via a conveying system 26 to the warehouse 12. The conveying system 26 can be implemented, for example, by a transporting network formed by steady conveyors (roller conveyors 70, chain conveyors, overhead conveyors, belt conveyors, etc.) and/or a driverless transporting system (DTS) 40 (cf. FIG. 6). No conveyor connection is provided between the separation stations 20 and the sorter 14.

The target locations 22 can also be coupled via a conveying system 26 to the (optional) shipping 24. No conveying connection is provided between the target locations 22 and the sorter 14.

The separation stations 20 and the target locations 22 are coupled, via reloading processes, to the sorter 14, as will still be explained in more detail below.

Additionally, the system 10 comprises a control device 28 which is indicated in FIG. 1 by a cloud. The control device 28 can be arranged centrally or in a decentralized manner in the system 10. The control device 28 is configured to carry out at least one or more of the following listed functions: storage-location administration, order administration and material-flow control. In particular, the control device 28 is configured to conduct a two-stage picking process where in a first stage, dependent on a batch formed, retrieval happens in an article-orientated manner and then separation happens in an order-orientated manner onto the sorter 14, and in a second stage distribution to the target locations 22 happens.

It is clear that the control device 28 can implement further functions of an intralogistics controlling computer. This will still be discussed below dependent on the relevance of these functions.

Further, it is clear that the control device 28 can be implemented by hardware and/or software.

It goes without saying that the system 10 can comprise further components of conventional intralogistics systems, which are not shown and will not be explained in more detail here, such as a goods receipt, a good issue, a packing station, a manual picking area, flow racks, vertically and/or horizontally circulating racks, shuttle racks, and the like.

In FIG. 1 the separation stations 20 are coupled to the warehouse 12 by the conveying system 26 which is generally indicated in FIG. 1 by arrows. The warehouse 12 preferably comprises a rack arrangement (not shown here) including one or more racks 48 (cf. FIG. 6) defining rack aisles 52 therebetween (cf. FIG. 6), in which rack aisles 52 storage and retrieval devices (not shown) are moved for storing storage containers 54 into the racks 48 and retrieving them from the racks 48. Retrieved storage containers 54 are supplied to the separation stations 20 in an article-orientated manner in accordance with a batch (i.e. a fixed quantity which has been concatenated in advance) of customer orders for removing a fixed number of articles 30 set by the batch (cf. FIG. 6) of an identical type of article, preferably individually, and for delivering the same, preferably individually, to the sorter 14, in particular to individual sorter trays 32 (cf. FIG. 6). Subsequently, the storage containers 54 are transported from the separation stations 20 via the conveying system 26 back again into the warehouse 12, and stored there. The sorter 14 distributes the removed and reloaded articles 30 by means of the trays 32 thereof, and delivers these articles 30 to the target locations 22 in an order-orientated manner. Typically, each of the target locations 22 is associated with one of the orders, as will still be explained in more detail below.

Figure 2:
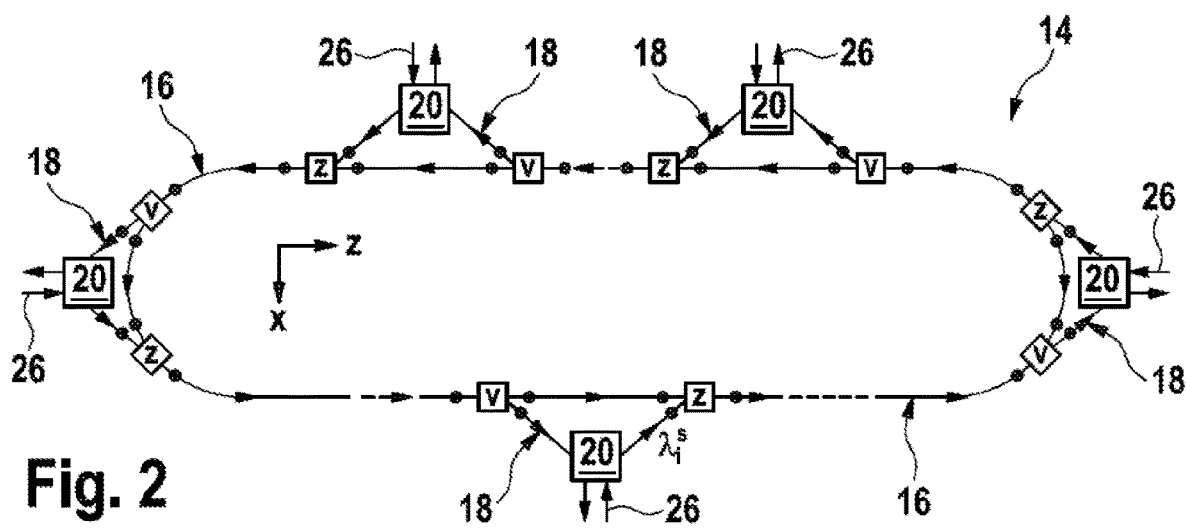
Figure 3:
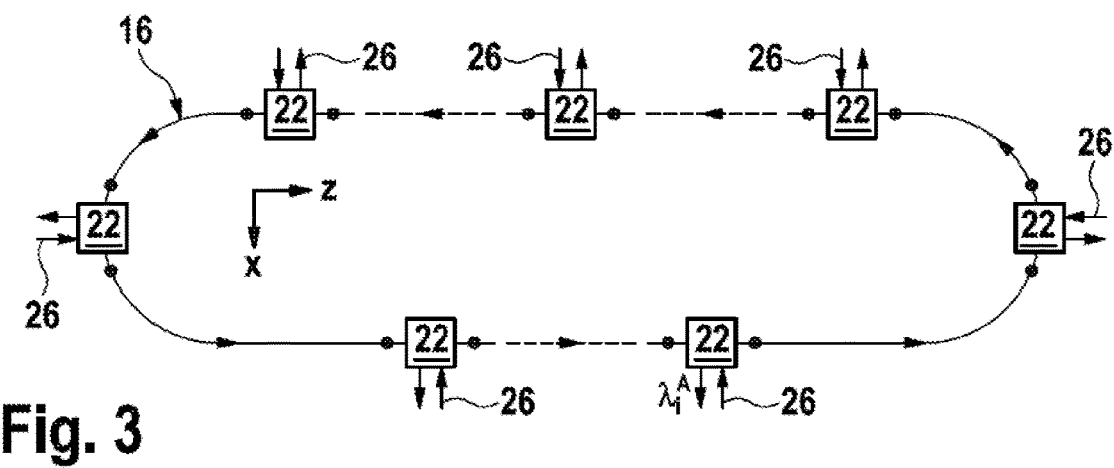
FIG. 3 illustrates the main line of FIG. 2 and an (isolated) link of target locations to the main line.

FIGS. 2 and 3 substantially serve for illustrating a course of the main line 16 as well as possible links of the separation stations 20 (FIG. 2) and the target locations 22 (FIG. 3) to the main line 16.

FIG. 2 shows an exemplary course of a main line 16 of a sorter 14, and in particular coupling of exemplary five separation stations 20 via respectively one mesh-shaped branch line 18 to the loop-shaped closed main line 16. By means of the mesh-shaped link of the separation stations 20 to the loop-shaped main line 16 the sorter trays 32 (not shown), which are hereinafter also briefly called "trays 32", are fed in and fed out of a main (traffic) stream on the main line 16.

The main stream distinguishes in that the trays 32 are moved substantially continuously, i.e. without a stop, on the main line 16. Continuously also means that the main stream can be moved in a clocked manner. However, it is preferred that the traffic on the main line flows without interruption.

Also, it is possible to vary the velocity of the trays 32 on the main line 16 (dynamically, i.e. dependent on demand). For example, the main line 16 can be operated during a first time phase at a maximum velocity, and in a subsequent time phase at a lower velocity. However, sections of the main line 16 are typically operated at the same velocity.

Further, it is clear that the trays 32 (cf. FIG. 6) are not connected fixedly (and permanently) to the main line 16, as will still be explained in more detail below. The trays 32 can be transported by adhesive friction only, for example, on a chain-link conveyor. One exemplary chain-link conveyor is offered, for example, by the company Bosch Rexroth under the name "VarioFlow plus", and is used, for example, as a circulating workpiece-carrier system for assembly lines in the automotive and electronic industries. One different chain-link conveyor which can be used in the system 10 is offered, for example, by the company FlexLink under the brand "FlexLink".

The trays 32, which can be transported on the branch lines 18, can also be stopped (temporarily), without disturbing the flowing traffic on the main line 16, for the purpose of being loaded at the separation stations 20.

The trays 32 can be realized by any transporting receptacle which can be positioned on the conveying means (not shown) of the main line 16 and branch lines 18. Further exemplary transporting receptacles are: containers, trays, and other load carriers used in intralogistics. Containers and trays distinguish substantially in a height of an edge surrounding a transporting area (i.e. a base).

In general, the branch lines 18 are coupled via suitable branching elements V and merging elements Z to the main line 16, as will still be explained in more detail below.

It is clear that the separation stations 20 can be distributed arbitrarily across the entire main line 16. In FIG. 2 all of the separation stations 20 are arranged outside the loop-shaped main line 16. It is clear that one or more separation stations 20 can also be arranged within the loop-shaped main line 16. However, the separation stations 20 are arranged outside along the long sections of the main line 16. The separation stations 20 can also be concentrated in certain areas, as exemplary indicated in FIG. 6.

It is clear that the course of lines shown in the FIGS. 2 to 6 are only of an exemplary nature. In FIG. 2 the main line 16 substantially extends along a rectangle. It is clear that the course of lines can be selected freely, and different shapes are possible. Also, sections of the lines do not necessarily need to run in parallel to each other but can be selected arbitrarily, for example, by comprising curves, upward inclinations, and/or downward inclinations (three dimensional routing).

FIG. 3 shows the same loop-shaped main line 16 like FIG. 2. FIG. 3 exemplary illustrates a (direct) coupling of the target locations 22 to the main line 16. The separation stations 20 are not shown here.

In spite of the direct link the target locations 22, however, are no obstacles blocking the traffic on the main line 16. In FIG. 3 the target locations 22 are marked merely in the course of the main line 16 for making clear that no other conveying elements, collecting elements, or transferring devices are provided between the main line 16 and the target locations 22. In this case delivery of the articles 30 off the trays 32 occurs while the trays 32 still move continuously on the main line 16.

However, it is clear that the target locations 22 can be coupled, like the separation stations 20 (compare FIG. 2), via branch lines 18 to the main line 16 as will still be explained in more detail below, but which is not shown in the FIG. 3.

In FIG. 3 seven target locations 22 are exemplarily shown. It is clear that more or less target locations 22 can be used.

Figure 4:
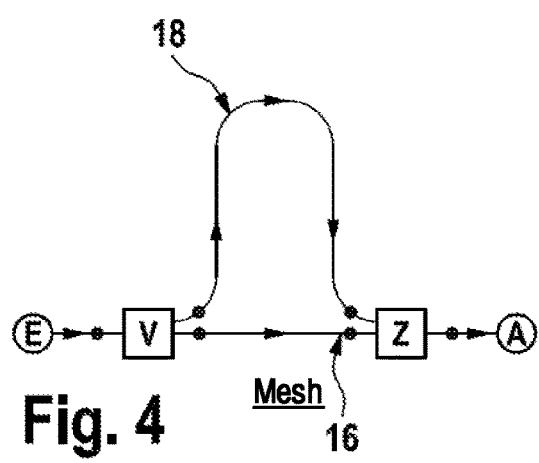
FIG. 4 illustrates a mesh-shaped branch line schematically.

FIG. 4 illustrates a mesh-shaped branch line 18 which in turn is coupled via a branching element V and a merging element Z to the main line 16, wherein the main line 16 is indicated only sectionwise including an entrance E and an exit A. The traffic (compare dark arrows) in the mesh-shaped branch line 18 has the same direction like the traffic on the main line 16. The trays 32 (not shown) move on both the branch line 18 and main line 16 from the entrance E to the exit A.

Figure 5:
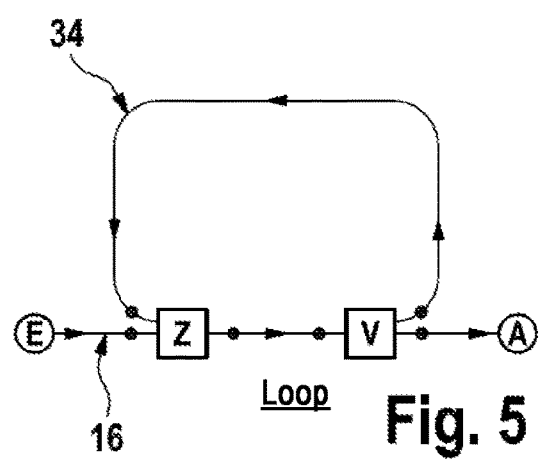
FIG. 5 illustrates a loop schematically.

In FIG. 5 a line loop, or loop, 34 is shown. The loop 34 is operated oppositely to the main line 16.

Figure 6:
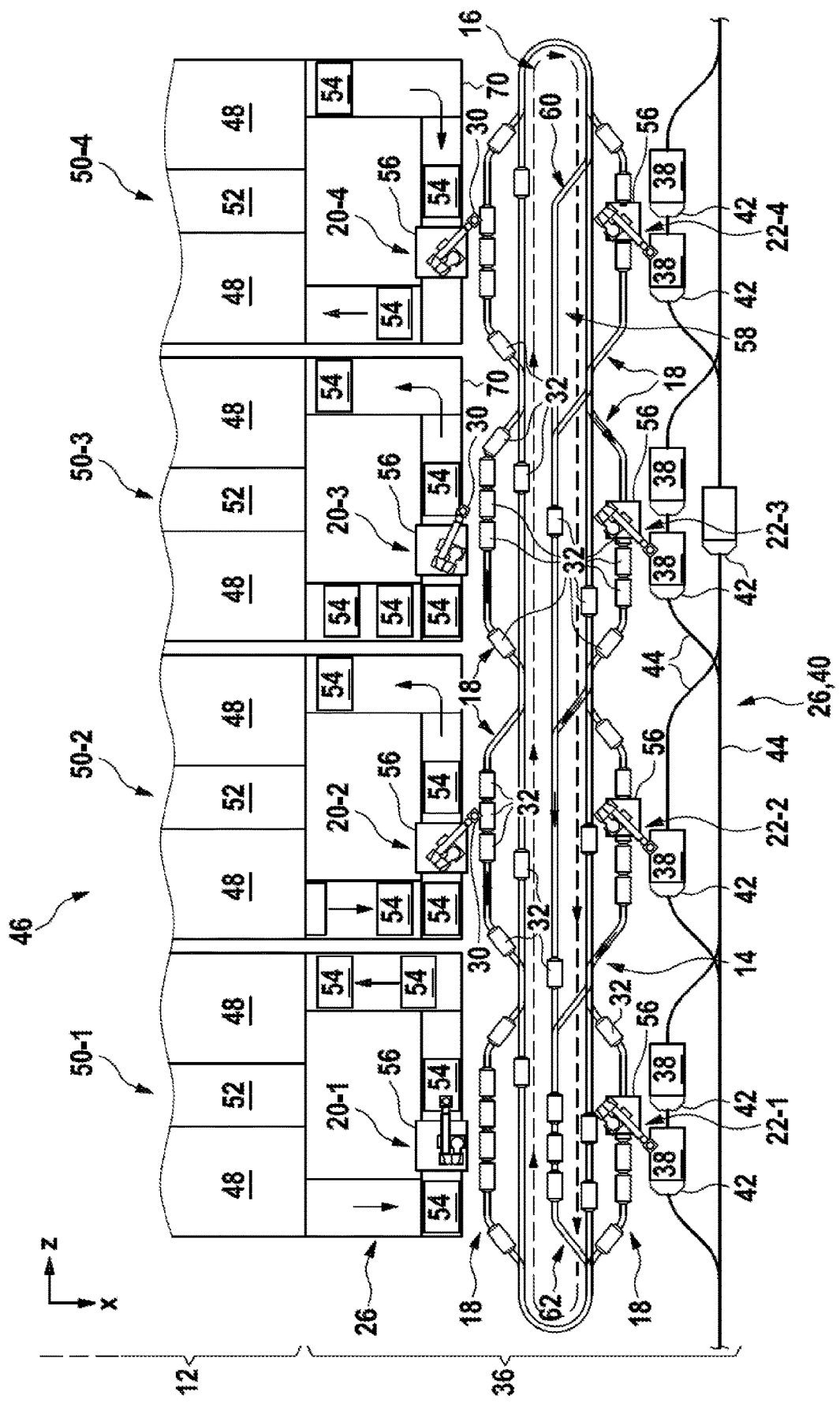
FIG. 6 shows a top view of an exemplary system.
Figure 12:
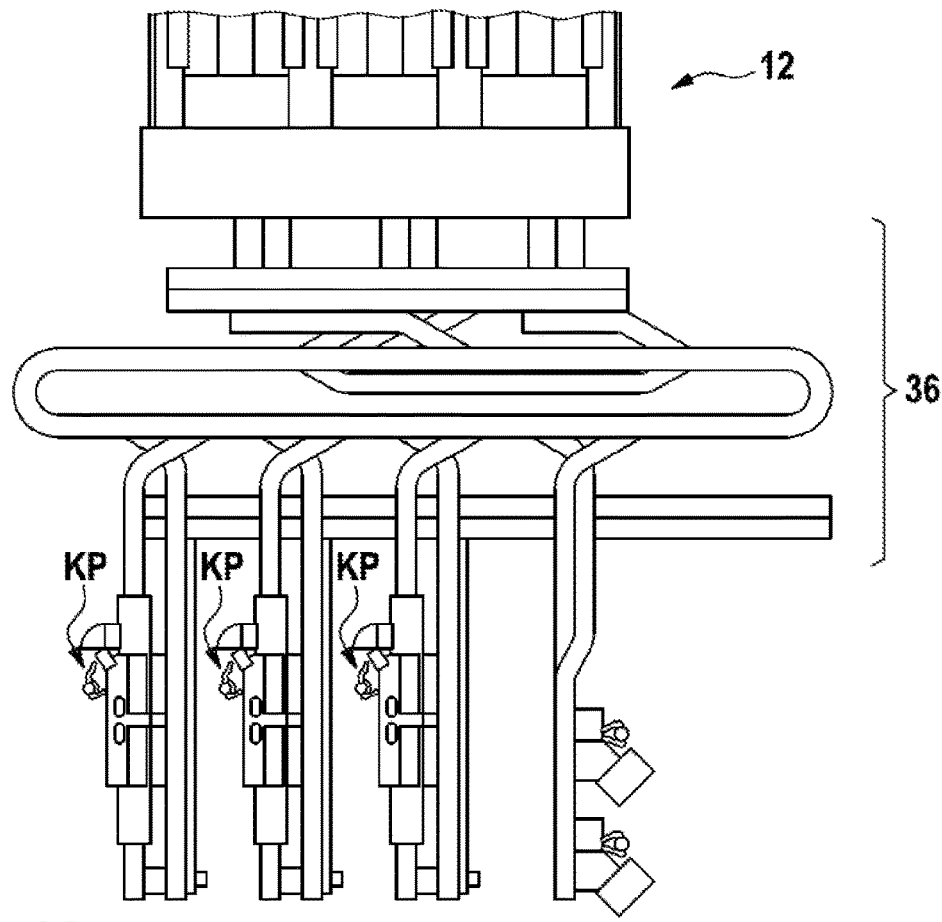
FIG. 12 shows a prior art order-picking system.

FIG. 6 shows a top view of an embodiment of the system 10. The warehouse 12 extends in the upper area of FIG. 6. An area 36, adjacent to the warehouse 12, extends in the lower area of FIG. 6 where conventionally the classical (conveyor) front zone is located which classically connected the warehouse 12 in terms of conveyors to the picking stations (cf. FIG. 12), where the picking process occurs. The classical front zone has been replaced by the sorter 14 in FIG. 6.

Beneath the sorter 14 a conveying system 26 for transporting order containers 38 follows in the longitudinal direction X. This conveying system 26 is illustrated only partially in FIG. 6, and substantially extends parallel to a front end of the warehouse 12, i.e. parallel to the transversal direction Z. This conveying system 26 is exemplarily implemented in terms of a driverless transporting system (DTS) 40 including a plurality of driverless transporting vehicles (DTV) 42 moving automatically along traveling paths 44. In spite of a guidance along the traveling paths 44 the DTV 42 move autonomously within the system 10. It is clear that, alternatively to the DTS 40, different conveyor types can also be used as will still be explained in more detail with reference to the FIGS. 7 to 9.

The warehouse 12 of FIG. 6 is exemplarily implemented in terms of a rack warehouse 46 including racks 48. Respectively two of the racks 48 define one rack module 50 including a rack aisle 52 therebetween. The racks 48 and the aisle 52 extend parallel to the longitudinal direction X. In each of the rack aisles 52 one or more storage and retrieval devices move which are not shown and designated in more detail here. The storage and retrieval devices (e.g., shuttles) are configured to store storage container 54 into the racks 48, to retrieve them from the racks 48, and transfer them within the racks 48.

In FIG. 6 exemplary four rack modules 50-1 to 50-4 are shown. It is clear that more or less rack modules 50 can be provided. The rack modules 50 are implemented, for example, in terms of an automatic small-parts warehouses (ASPVV).

Further, it is clear that instead of a rack warehouse 46 a (not shown) pallet warehouse, tray warehouse, carton warehouse, or mixed type of these types of warehouses can also be used, wherein racks 48 do not need to be used necessarily.

As an alternative to the storage containers 54 different storage receptacles can be used as well, such as trays, cartons, pallets, overhead-conveyor pockets, or other load carriers. The same is true for the order containers 38. The order containers 38 can also be implemented by trays, cartons, pallets, or other load carriers.

If order containers 38 are mentioned here, this means that one collecting receptacle is associated in terms of data with one of the customer orders. The order containers 38 can also be used as shipping receptacles for avoiding repackaging at the shipping 24. In this case the order containers 38 are preferably implemented by cartons, or plastic containers, which can be transported by the DTV 42.

In FIG. 6 each of the rack modules 50 is followed by a (storage-container) conveying system 26 which is exemplarily implemented here in terms of a roller conveyor 70. Preferably, each of the rack modules 50 is provided with a separate storage-container conveying system 26 which connects to the front end of the racks 48, in particular in a U-shape.

Alternatively, the storage-container conveying systems 26 of the different rack modules 50 can also be connected among each other which is not shown in FIG. 6.

The storage-container conveying system 26 is configured to move retrieved storage container 54 to the separation stations 20 for removing articles 56 from the storage containers 54 and delivering the same to the sorter trays 32. After the removal of the articles 30 the storage containers 54 are transported back into the warehouse 12 for the purpose of storage.

The storage containers 54 are filled in an "article-pure" manner. This means that the storage containers 54 preferably contain articles 30 of one single type of articles only. It is clear that the storage containers 54 can also be divided into compartments (not shown) for storing different types of articles within the same storage container 54. Also these compartment-divided storage containers 54 are article-pure.

Further, it is also possible to store in advance certain types of articles without a partition of compartments, i.e. chaotically, in the same storage container 54. Such an operation assumes, however, that the separation stations 20 are capable of distinguishing the (expected) types of articles contained in this storage container 54 currently presented. Preferably, types of articles (chaotically mixed), which can be simply distinguished, are stored in this type-pure storage container 54. In this case, the control device 15 determines in advance the mixture of the different types of articles for each of these mixed type-pure storage containers 54. For this purpose, the control device 28 can comprise the functionality of a warehouse-management computer.

The control device 28 is further used for processing orders, and in particular for forming batches at the first picking stage. For this purpose a predetermined quantity of customer orders, or picking orders, is collected and analyzed with regard to the types of articles (or order lines) contained therein for retrieving as less as possible storage container 54 containing the required types of articles in accordance with the customer orders.

At the separation stations 20 these types of articles are then removed from the corresponding storage containers 54 according to the corresponding (overall) number, and distributed and reloaded onto the trays 32. Preferably, the reloading is always conducted such that one piece (i.e. one article 30) is deposited on each of the trays 32. However, it is also possible to simultaneously remove several pieces of the same type of article from the storage containers 54 and reload them onto one single tray 32 when the corresponding order line of the associated customer order required several pieces of the same type of article. In this case, the separation station 20 is configured to remove several pieces from the storage container 54 at the same time.

The separation stations 20, wherein FIG. 6 exemplarily shows four of them, can be operated automatically and/or manually.

In FIG. 6 each of the rack modules 50-1 to 50-4 is respectively provided with one separation station 20. The separation stations 20 of FIG. 6 are exemplarily implemented by respectively one robot 56. Alternatively, humans (not shown) can be used. Further, it is possible that some of the separation stations 20 are operated by the robot 56 while other separation stations 20 are operated by the humans.

Now the sorter 14 of FIG. 6 is considered in more detail.

The sorter 14 of FIG. 6 represents an annular closed transporting structure which is structured analogously to the FIGS. 2 to 5. The closed loop-shaped main line 16 is indicated in FIG. 6 by a dashed line. The main line 16 is operated continuously, for example, in a clockwise direction. Traffic of the trays 32 substantially is not stopped. This means that the trays 32 on the main line 16 can be conveyed preferably at a constant velocity, in particular when the main line 16 is implemented by a closed chain-link conveyor. The constant velocity on the main line 16 can also be achieved by a clocked movement.

A plurality of branch lines 18 connect to the main line 16. In particular, each of the separation stations 20-1 to 20-4 is provided by a dedicated branch line 18. The trays 32 can be discharged from the main line 16 onto these branch lines 18 where the trays 32 do no longer need to be moved continuously. The trays 32 can also be stopped on the branch lines 18.

The trays 32 preferably stop in the direct vicinity of the robots 56 for allowing the robot 56 to remove a desired article 30 from the storage container 54 and to deliver the same onto one of the trays 32. As soon as the tray 32 is loaded with the article 30, the loaded tray 32 can be fed back again into the main line 16 for reaching its associated target location 22, as will still be explained in more detail below.

Additionally and alternatively, empty and loaded trays 32 can be buffered temporarily on one or more buffer lines 58. In FIG. 6 exemplary one buffer line 58 is shown which is connected via one or more infeed lines 60 and one or more outfeed lines 62 to the main line 16. The buffer line 58 extends, for example, substantially parallel to the transversal direction Z and is preferably arranged within the loop-shaped main line 16.

It is clear that transversal connecting lines (not shown) can be provided generally within the loop-shaped main line 16 additionally, in particular for individually shortening the (transporting) paths between the separation stations 20 and the target locations 22. In the example of FIG. 6 such a transversal connecting line may run centrally from the upper long section of the main line 16, which extends parallel to the transversal direction Z, to the lower long section of the main conveying line 16, which also extends parallel to the transversal direction Z. This transversal connecting line then runs in the longitudinal direction X.

The system 10 of FIG. 6 further comprises exemplarily four target locations 22-1 to 22-4. The target locations 22 of FIG. 6 are exemplary operated automatically as well, i.e. the target locations 22 are also provided with one robot 56. Alternatively, the target locations 22 can also be operated manually.

The target locations 22 of FIG. 6 in turn are connected to the main line 16 respectively by one individual branch line 18. This allows to stop the trays 32 at the target locations 22 so that the robot 56 can reload the articles 30, which are positioned on the trays 32, in an order-orientated manner into the order containers 38. The corresponding order containers 38 are transported by the DTV 42 into the operation area of the respective (target-location) robot 56 so that the robot 56 can deliver the article 30, which has been removed from the tray 32, to the corresponding order container 38.

The control device 28 is configured to direct (synchronized) all (loaded) trays 32 belonging to one specific order to the associated target location 22. For this purpose trays 32 can be directed directly from the separation stations 20 and from the buffer lines 58 to the target location 22.

At the target location 22 the second picking stage is completed. This means that the trays 32 are transported in an order-orientated manner from the separation stations 20 and/or buffer lines 58 to the target location 22 specified by their customer order. If the customer order includes several articles (pieces and/or types of articles) 30, the correspondingly loaded trays 32 are moved to the target location 22 thereof. These trays 32 can arrive at the target location 22 thereof, in particular in a sequenced manner. For this purpose the control device 28 controls the material flow correspondingly. The trays 32 can overtake each other by using, for example, the buffer line 58.

Further, it is possible to pick in advance certain articles 30 being associated with a specific order, this means that these specific article 30 are already loaded at an earlier time onto one or more of the trays 32, wherein the corresponding loaded trays 32 are then "parked" (for a longer time) in one of the buffer lines 58. As soon as all articles 30 belonging to this specific order are located on trays 32 of the sorter 14, these trays 32 can be moved (orchestrated) to their target location 22.

For this purpose the control device 28 is also provided with the functionality of a material-flow computer.

As an alternative to the mesh-shaped buffer lines 58 the sorter 14 can generally comprise spur lines (not shown). A spur line is comparable to a dead end. This means that the spur line needs to be operated bidirectionally for filling and emptying the spur line with trays 32. In particular, the spur lines are suitable for long-term buffering the trays 32. In this case preferably either empty trays 32 or loaded trays 32 are buffered only. If loaded trays 32 are buffered the buffering preferably occurs in an order-orientated manner. This means that preferably each of the spur lines always buffers trays 32 belonging to the same customer order only.

It is clear that the main line 16 has a finite capacity for receiving the trays 32. The trays 32 are preferably dimensioned identically. The geometrical length of the main line 16 results in a maximum receiving capacity for the trays 32.

However, the present sorter 14 is capable of handling more trays 32 than determined by its maximum capacity.

The branch lines 18 and buffer lines 58 (and, if necessary, even the spur lines) allow handling of more trays 32 at the same time within the system 10. It goes without saying that the main line 16 cannot take more loaded trays 32 than predetermined by its overall capacity. Nevertheless additional trays 32 can be handled, in particular in the region of the branch lines 18 (and/or 58) which link the separation stations 20 and the target locations 22 to the main line 16.

Figure 7:
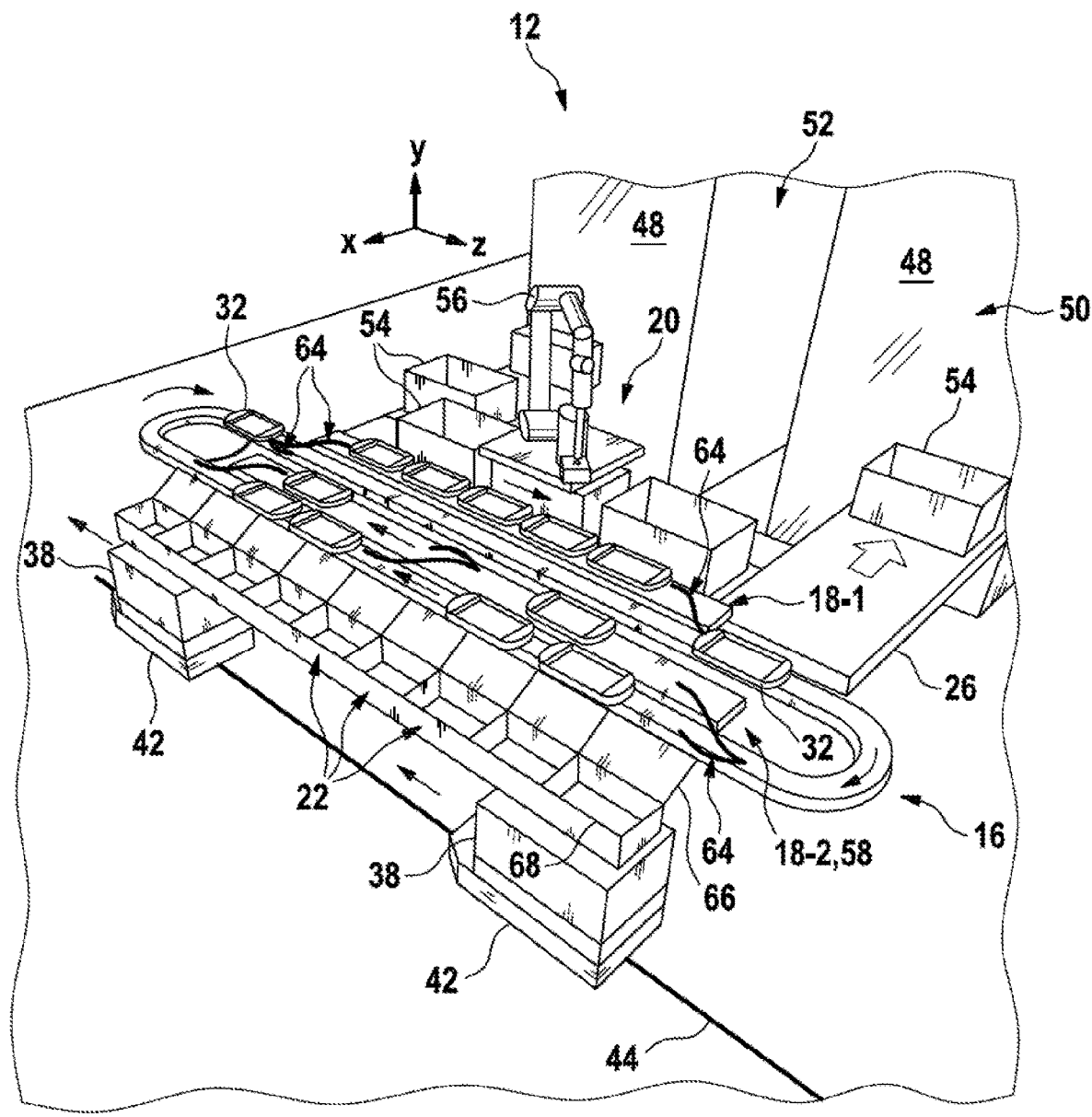
FIG. 7 shows a first linking possibility for target locations.

FIG. 7 shows a perspective view of a further embodiment of the system 10 structured very similar to the system 10 of FIG. 6 so that substantially the differences will be explained in more detail in the following.

The warehouse 12 comprises merely one single rack module 50 including two racks 48 and one rack aisle 52. The sorter 14 includes a loop-shaped main line 16 and two branch lines 18-1 and 18-2. The branch line 18-1 serves for linking the automated separation station 20, which is implemented by a robot 56. The branch line 18-2 serves as a buffer line 58.

The branch lines 18-1 and 18-2 substantially run parallel to the main line 16, and are arranged, preferably directly, adjacent to the main line 16.

Further, in FIG. 7 branching elements V and merging elements Z are shown in terms of rails 64. The trays 32 can change between the main line 16 and the branch lines 18 (and/or 58) by means of the movably supported rails 64 by passively transferring the trays 32 by means of the movement of the conveyor which implements the lines 16 and 18. It is clear that the branching elements V and the merging elements Z (compare FIGS. 4 and 5) can also be operated actively, for example, by a liftable and lowerable belt-transferring device (not shown) 72 (cf. FIG. 8), or a pusher (not shown).

The sorter 14 is dimensioned such that it comprises in the transversal direction Z a similar width like the rack module 50.

The sorter 14 is directly adjacent to a plurality of target locations 22. In FIG. 7 exemplary eight target locations 22 are shown which are implemented as chutes 66 and collecting containers 68. The collecting containers 68 can be opened downward actively for giving the collected articles 30 into the order containers 38, which are positioned beneath the collecting containers 68, for example, by means of DTVs 42.

The target locations 22 are coupled directly to the main line 16 (compare FIG. 3) by arranging the chutes 66 in the direct vicinity of the main line 16. The chutes 66 are slightly inclined towards the collecting containers 68 so that the articles 30 slide autonomously into the collecting containers 68 due to gravity.

In case of a direct link of the target locations 22 to the main line 16, i.e. without using a robot 56 or a human for unloading, the trays 32 are provided with a mechanism (not shown) for autonomously delivering the articles 30, which are loaded onto the respective trays 32, to the desired chute 66 (in an order-orientated manner). For this purpose the trays 32 can be provided with, for example, a tilting mechanism triggered by a link (not illustrated) while the trays 32 pass the respective target location 22. Hence, the trays 32 do not stop during the unloading process.

Alternatively, the tray 32 can be inclined permanently, wherein a surrounding wall can opened and closed (not shown).

As soon as all articles 30 belonging to the picking order are collected in the associated collecting container 68 and as soon as the corresponding order container 38 is positioned beneath the corresponding collecting containers 68, the collection container 68 can be emptied automatically by means of the control device 28 by opening, for example, a base (not shown) of the collecting container 68.

Figure 8:
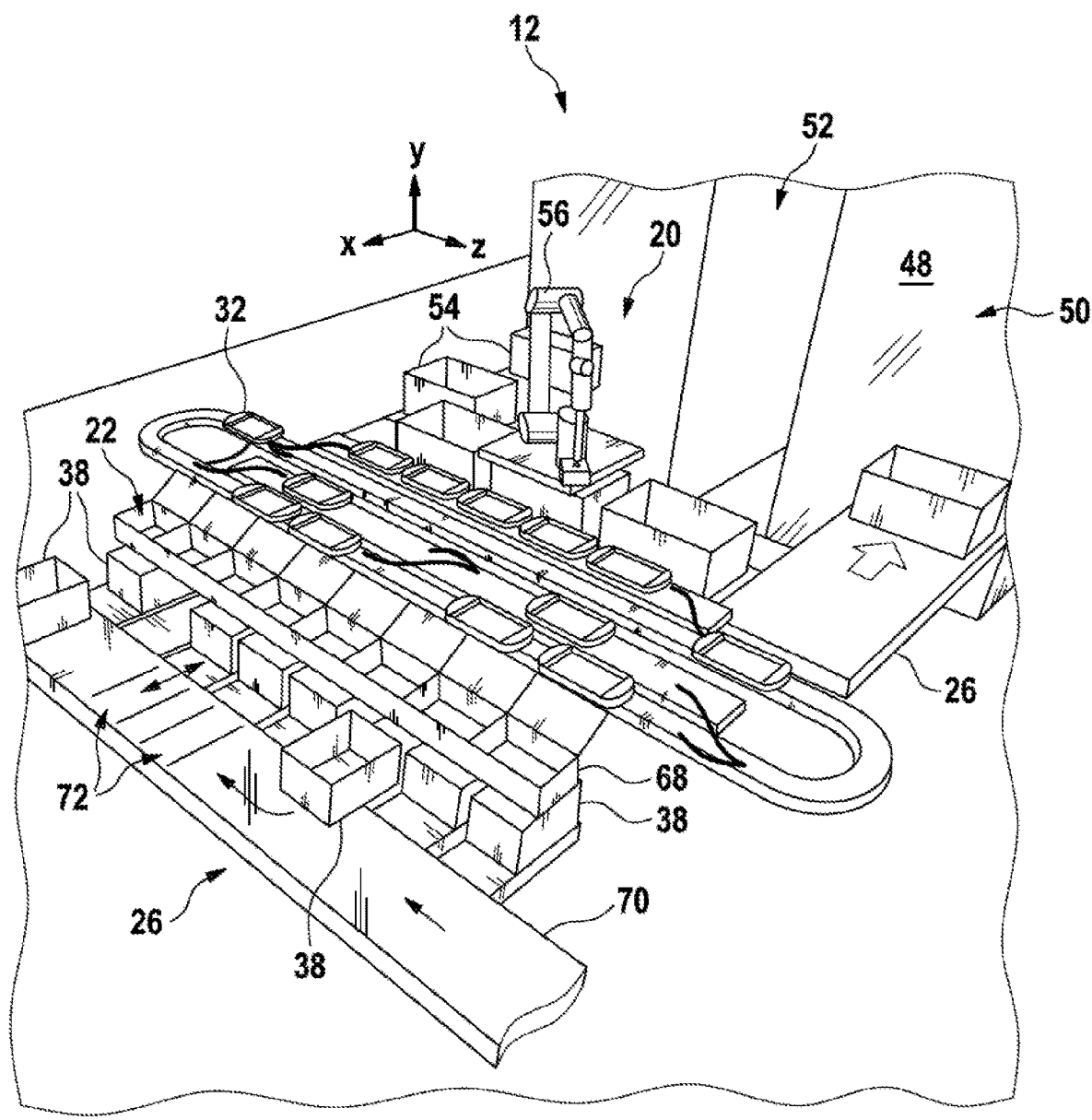
FIG. 8 shows a second linking possibility for target locations.

FIG. 8 shows a perspective view of a further embodiment of the system 10 formed almost identically to the system 10 of the FIG. 7. The system 10 of FIG. 8 only distinguishes from the system 10 of FIG. 7 in the conveying system 26 transporting the order containers 38 to the target locations 22. Here the conveying system 26 for the order containers 38 is exemplary implemented as a roller conveyor 70 positioning the order containers 38, via exemplary belt-outfeeding devices 72, beneath the collecting containers 68.

Figure 9:
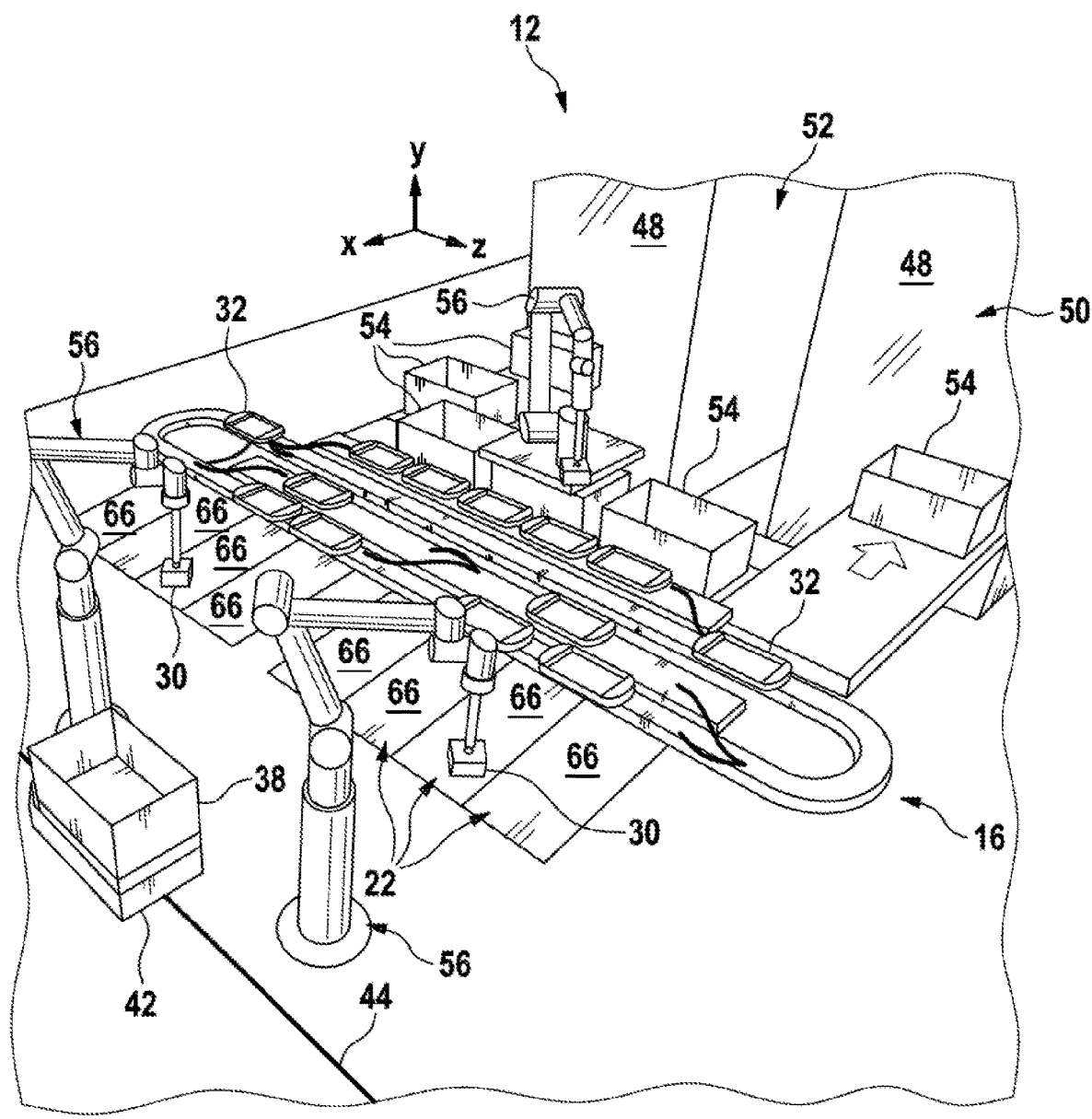
FIG. 9 shows a third linking possibility for target locations.

FIG. 9 shows a further embodiment of the system 10 formed very similar to the embodiments of FIGS. 7 and 8. The embodiment of FIG. 9 distinguishes from the embodiments of FIGS. 7 and 8 in that the target locations 22 are defined by chutes 66 alone, which are automatically operated by robots 56. Each of the chutes 66 is inclined relative to a horizontal line so that the articles 30 autonomously slide to the lower end of the chute 66 and are collected there so that the robot 56 can remove the articles 30 at the lower end and transfer them into the order containers 38, which in turn are transported by means of a DTS 40. Each of the chutes 66 represents an individual target location.

The robots 56 are typically equipped with devices for position recognition of the articles 30 in order to allow controlling the picking unit. Additional means for an identification of articles can be provided at the robot, in particular at the picking unit. Therefore, it is possible to form the region of the target location, which is operable by the picking unit, physically as one part and logically in an arbitrarily distributed manner. As a result, the number of the (logical) target locations can be set flexibly.

It is clear that the different solutions for the target locations 22, which are shown in the FIGS. 7 to 9, can be combined with each other arbitrarily. Further, it is clear that the target locations 22 can also be operated manually, in particular when reloading processes are required.

With reference to the FIGS. 10 and 11 possibility of linking one or more separation stations 20, by means of conveyors, to the warehouse 12 or the corresponding rack module 50 will be explained below. This conveyor link represents an independent invention independent of the use of a sorter 14, which will be explained hereinafter in more detail.

Figure 10:
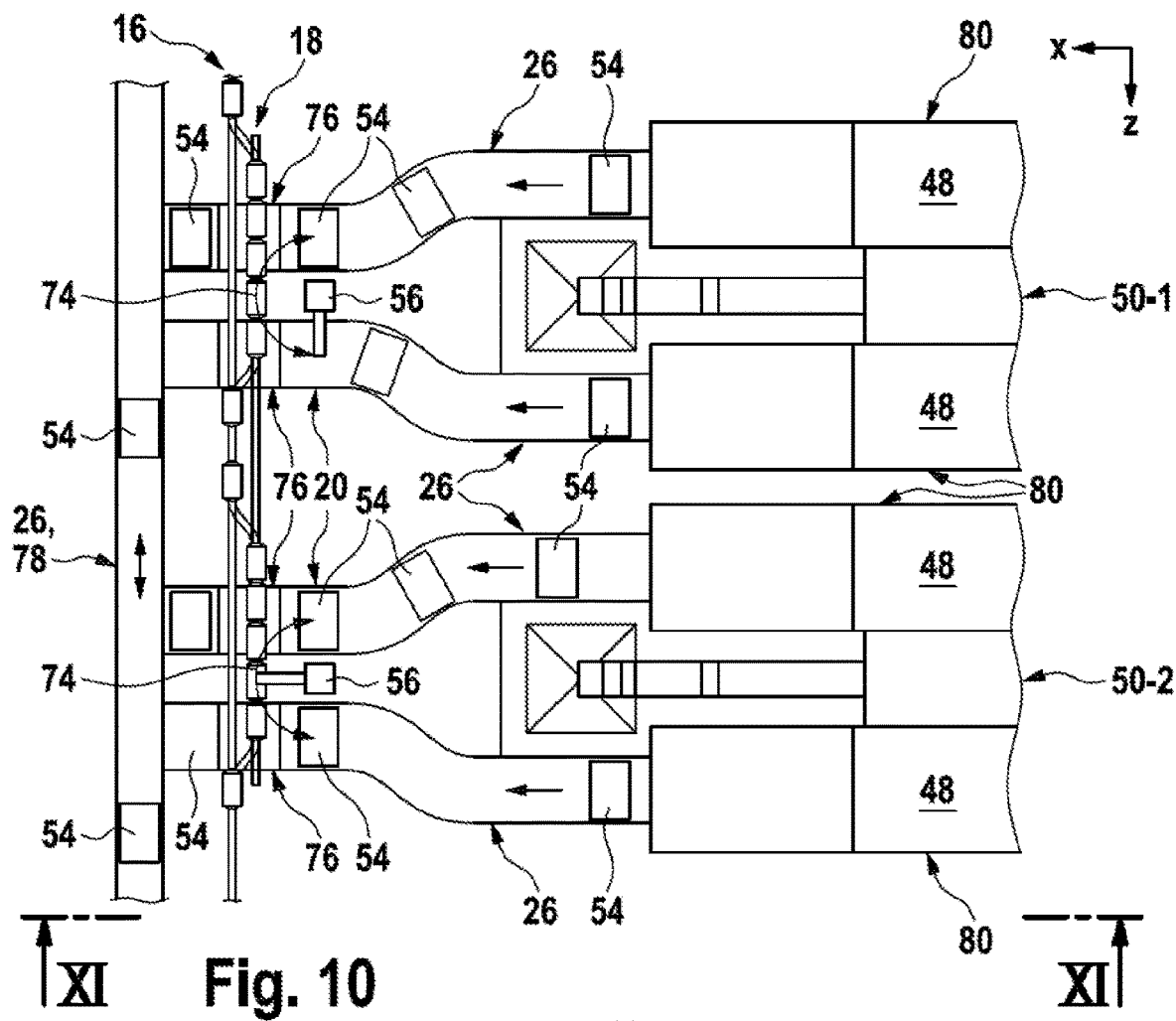
FIG. 10 shows a top view of a linking possibility for separation stations.
Figure 11:
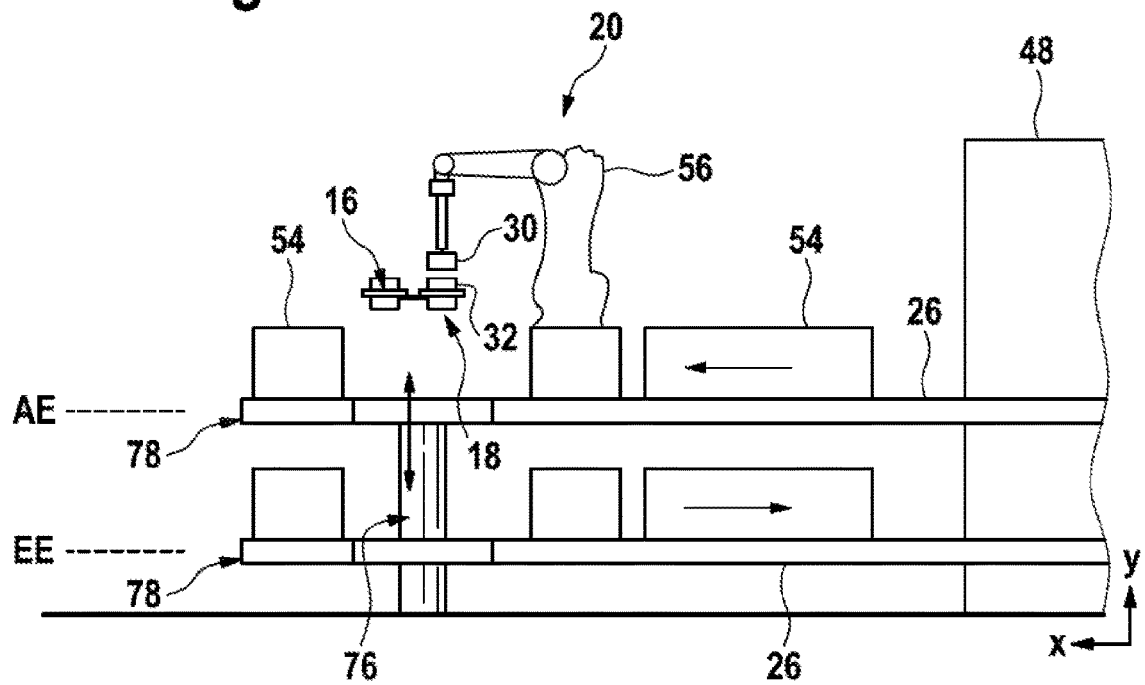
FIG. 11 shows a side view of FIG. 10 along line XI-XI of FIG. 10.
Figure 13:
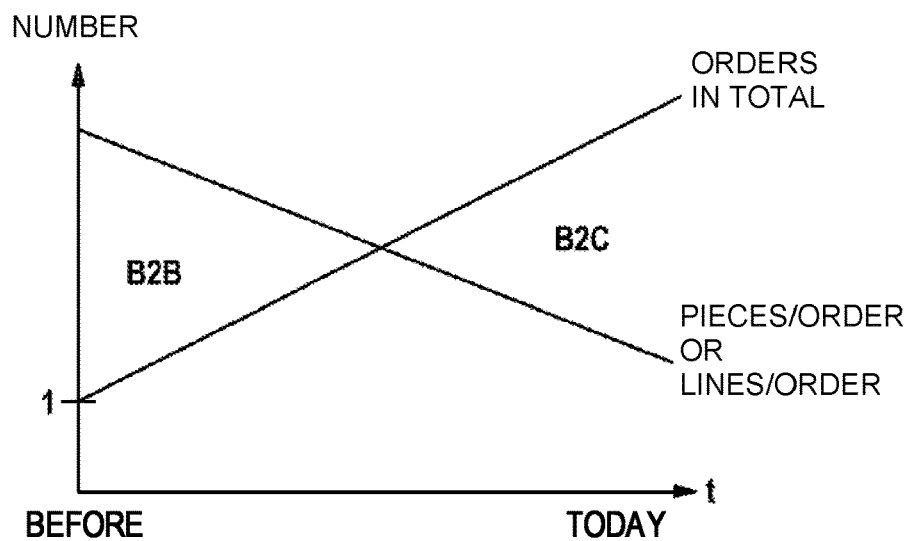
FIG. 13 shows a graph of the development of an average order structure over time.

FIG. 10 shows a top view, and FIG. 11 shows a side view along line XI-XI in FIG. 10.

The link in accordance with the FIGS. 10 and 11 is distinguished in that several conveying strings per separation station 20 are provided, in particular in different planes. FIG. 11 exemplary shows that the retrieval of the storage container 54 occurs in a retrieval plane AE, and storing occurs in a storage plane EE arranged below.

Further, the application in accordance with the FIGS. 10 and 11 is distinguished in that in the retrieval plane AE each of the robot 56 of the separation station 20 is supplied with the storage containers 54 via at least two separate conveying systems 26.

This allows each of the robot 56 to move back and forth by means of a (e.g. almost semi-circular) pivotal movement, which is indicated in FIG. 10 by means of an arrow 74, between two storage containers 54, or picking positions, for receiving the articles 30 from the storage containers 54, wherein a received article 30 (not shown) can be delivered, for example, at the center of the pivotal movement to one tray 32 by simply dropping the article.

It is clear that the course of lines of the conveying systems 26 for the storage containers 54 and of the branch line 18 for the trays 32 is arranged correspondingly. This means that the pick-up points, or the removal positions from the storage containers 54, and the point for delivering to the trays 32 are preferably located on a circular track having a constant radius.

Further, the conveying system 26 for the storage containers 54 are arranged at a height such that the robot 56 only needs to move a little in the height direction Y for picking the articles 30. The same applies analogously for the arrangement of the trays 32 during the delivery.

This type of arrangement shortens the cycle time during the separation of the articles 30 from the storage containers 54 into the trays 32. The storage containers 54 can be exchanged on the one conveying system 26 while the robot 56 picks from the storage container 54 provided on the oppositely arranged conveying system 26. Thus, the robot 56 never needs to wait for a new storage container 54.

Further, the robot 56 can drop removed articles 30 onto the tray 32 while the robot 56 moves on the circular track from the one picking location to the opposite picking location. The robot 56 is not required to stop for delivering the article 30 to the tray 32.

In a non-preferred operation mode the robot can also place articles 30 onto trays 32 which are moved on the main line 16 of the sorter 14. This can contribute to a wear-optimized operation of the system while the throughput is decreased and thus also the conveying velocity of the sorter is decreased.

The conveying systems 26 are preferably operated unidirectionally. In the retrieval plane AE the conveying systems 26 are operated such that the conveying direction is directed away from the warehouse 12. In the storage plane EE the conveying systems 26 are operated such that the storage containers 54 are transported into the warehouse 12. This is indicated by corresponding arrows in FIGS. 10 and 11.

In order to cope with the return transporting of the storage containers 54 from which the articles 30 have already been removed, for example, the storage plane EE is provided. For overcoming the height difference between the retrieval plane AE and the storage plane EE at least one lifting device 76 is provided which is equipped with a corresponding platform movable in the vertical direction Y between the planes AE and EE (compare FIG. 11).

As soon as the robot 56 has removed the required overall number of articles 30 from the storage container(s) 54 (from left and right), the storage container 54 is transported from the removal position to the lifting device 76. The lifting device 76 transports this storage container 54 subsequently from the retrieval plane AE into the storage plane EE. From there this storage container 54 can be transported into the rack 48 again.

Alternatively, the storage containers 54 can also cross the lifting device 76 for reaching a distributing line 78 which exemplarily extends in parallel transversal direction Z in FIGS. 10 and 11. The distributing line 78 allows exchanging of the storage containers 54 between the rack modules 50-1 and 50-2 (compare FIG. 10).

Via the distributing line 78 also a goods-receipt area (not illustrated) can be linked for filling, or replenishing, the warehouse 12 with new articles.

It is clear that the rack modules 50 comprise corresponding rack-lifting devices 80 in order to allow distribution of the storage containers 54 across rack planes (not illustrated here) along the height direction Y.

Manually operated separation stations 20 (not shown here) can also be linked, in order to pick articles which are not suited for robots. The merging with robot-able articles is conducted via the sorter 14 and the trays 32.

The storage containers 54 can also "loop" across the lifting devices 80, i.e. can be presented again, for example, for correcting picking errors without storing them before.

Returning to the figures, it is to be noted that, if (sorter) trays 32 have been mentioned above, it is clear that the trays 32 do not necessarily need to be formed as trays. The trays 32 can also be implemented by containers, trays, workpiece carriers, or the like. However, there is an advantage when the trays 32 comprise a substantially surrounding edge preventing that articles which are loaded on the tray 32 can fall off the tray 32 during the transportation from the separation station 20 to the associated target location 22.

As already mentioned above, the trays 32 are not permanently connected to the conveying means of the main and branch lines 16 and 18. In this sense the trays 32 can be positioned freely on the conveying means of the main and branch lines 18, wherein the trays 32 are preferably held by the adhesive friction being determined by their own weights on the conveying means.

In general it is true that the sorter 14 can also be linked to different (logistic) areas of the system 10. Lines which are not shown and designated in more detail here are used for linking which are formed analogously to the above-mentioned branch lines 18 and spur lines.

For example, the sorter 14 may be linked to a further storage area (not shown here) where manual picking is conducted, in particular even in accordance with the man-to-goods principle. The corresponding conveying system may be guided along the racks so that humans do not need the carry the trays 32.

Further, the sorter 14 can be linked to a buffer for empty trays 32, which is not shown here, in order to supply the sorter 14 in a demand-dependent manner with additional (empty) trays 32 which are then loaded at the separation stations 20.

Further, reloading stations may be provided where the articles 30 are reloaded from pockets of an overhead conveyor (not shown) onto the trays 32.

Finally, it is possible to additionally connect a buffer for loaded trays 32 to the sorter 14. In this buffer trays 32 can be buffered which are loaded, for example, predictively with the articles 30. This means that at the time of loading it is possible that a corresponding customer order is not yet present or orders are temporarily shifted (or need to be shifted).

In this case the loading is conducted based on statistical considerations by evaluating customer orders of the past and already loading such articles which occur very frequently or always within a period (for example, within one day) in the customer orders.

Further, it is clear that the robot 56 at the target locations 22 can also pick directly from the trays 32 and deliver to the order containers 38 so that the chutes 66 and/or the collecting containers 68 are not necessarily needed.

LIST OF REFERENCE NUMERALS

| 10 | storage and order-picking system |
|---|---|
| 12 | warehouse |
| 14 | sorter |

-continued

| | |
|---|---|
| 16 | main line |
| 18 | branch line |
| 20 | separation station |
| 22 | target location |
| 24 | shipping |
| 26 | conveying system |
| 28 | control device |
| 30 | article |
| 32 | sorter tray |
| V | branching element |
| Z | merging element |
| E | entrance |
| A | exit |
| 34 | loop |
| 36 | front zone |
| 38 | order container |
| 40 | driverless transporting system |
| 42 | driverless transporting vehicle |
| 44 | traveling path |
| 46 | rack warehouse |
| 48 | rack |
| 50 | rack module |
| 52 | rack aisle |
| 54 | storage container |
| 56 | robot |
| 58 | buffer line |
| 60 | infeed line |
| 62 | outfeed line |
| 64 | rail |
| 66 | chute |
| 68 | collection container |
| 70 | roller conveyor |
| 72 | belt-outfeeding device |
| 76 | lifting device |
| 74 | pivot motion |
| 78 | distributing line |
| 80 | rack-lifting device |

The invention claimed is:

1. A storage and order-picking system, comprising:
a control device configured for performing two-stage picking of articles, wherein the two-stage picking comprises a first article-orientated picking stage, and a second order-orientated picking stage;
a warehouse, wherein the articles in the warehouse are stored in storage containers in an article-pure manner, and wherein the articles are retrieved in an article-orientated manner from the warehouse in the first picking stage;
a sorter comprising:
 a loop-shaped main line operated continuously;
 at least one branch line, wherein each of the branch lines is coupled to the main line and is operable discontinuously; and
 a plurality of sorter trays, wherein each of the trays is configured to be moved along the lines and to be fed into and out from the main line;
one or more separation stations, wherein each of the separation stations:
 is coupled to the main line via one of the branch lines;
 is coupled to the warehouse for being supplied with storage containers; and
 is configured for reloading the articles from the storage containers onto the trays for transferring the articles in the first picking stage in accordance with order lines and/or individually onto respectively one of the trays located on the one of the branch lines;
and a plurality of automatically and/or manually operated target locations for the second picking stage, wherein each of the target locations is coupled:
 to one of the branch lines; and/or
 directly to the main line.

2. The system of claim 1, further comprising a conveying system for order containers which supplies the target locations with order containers.

3. The system of claim 1, wherein each of the target locations comprises a chute and/or a collecting container.

4. The system of claim 1, wherein the trays and/or the target locations are configured to automatically unload articles, which are loaded onto the respective tray, in an order-orientated manner at the location of the corresponding target location.

5. The system of claim 1, wherein the sorter further comprises transversal connecting lines within the main conveying line, which is formed as an endless closed-loop, so that trays can overtake each other and transporting paths from the separation stations to the target locations are shortened.

6. The system of claim 1, wherein the control device is configured to cause, in the first picking stage, a retrieval of the storage containers from the warehouse in an article-orientated manner in accordance with batch-picking.

7. The system of claim 1 which further comprises at least one of the following components: a buffer for empty trays; a picking buffer for pre-loaded trays; a link to manual or automatic picking areas; removal/delivery areas; and/or a link to a loading/unloading station for overhead-conveyor pockets.

8. The system of claim 1, wherein the sorter is implemented by a conveyor system operated continuously at a steady rate.

9. The system of claim 1, wherein the warehouse comprises at least one storage module formed by two racks including a rack aisle therebetween, wherein at least one separate separation station is associated with each of the rack modules.

10. The system of claim 9, wherein the storage containers are fed via at least two separate conveying systems to the associated separation station, which comprises a robot for transferring the articles.

11. The system of claim 10, wherein two further separate conveying systems are provided which are configured for transporting the storage containers back into the warehouse after removal of articles by the robot.

12. The system of claim 11, wherein the two further separate conveying systems are arranged beneath the two separate conveying systems and are connected to the two separate conveying systems via respectively one lifting device.

13. The system of claim 1, wherein the sorter being arranged at a front end in front of the warehouse is not wider than the warehouse.

14. The system of claim 8, wherein the conveyor system comprises an endless circulating transporting element that operates at a steady rate without interruption.

15. The system of claim 14, wherein the conveyor system includes a chain-link, belt, roller or overhead conveyor.

16. The system of claim 1, wherein each of the branch lines is coupled mesh-shaped to the main line.

17. The system of claim 4, wherein the trays and/or the target locations are configured to automatically unload by tilting.

18. The system of claim 10, wherein the robot is arranged between the separate conveying system such that during one movement cycle the robot can remove from each of the separate conveying systems respectively one article and deliver one article, which has already been removed, to one of the trays between the corresponding article removals.

19. The system of claim 10,
wherein the storage containers are fed via the at least two separate conveying systems to the associated separation station unidirectionally; and
wherein two further separate conveying systems are provided which are configured for unidirectionally transporting the storage containers back into the warehouse after removal of articles by the robot.

\* \* \* \* \*